Figure 1:
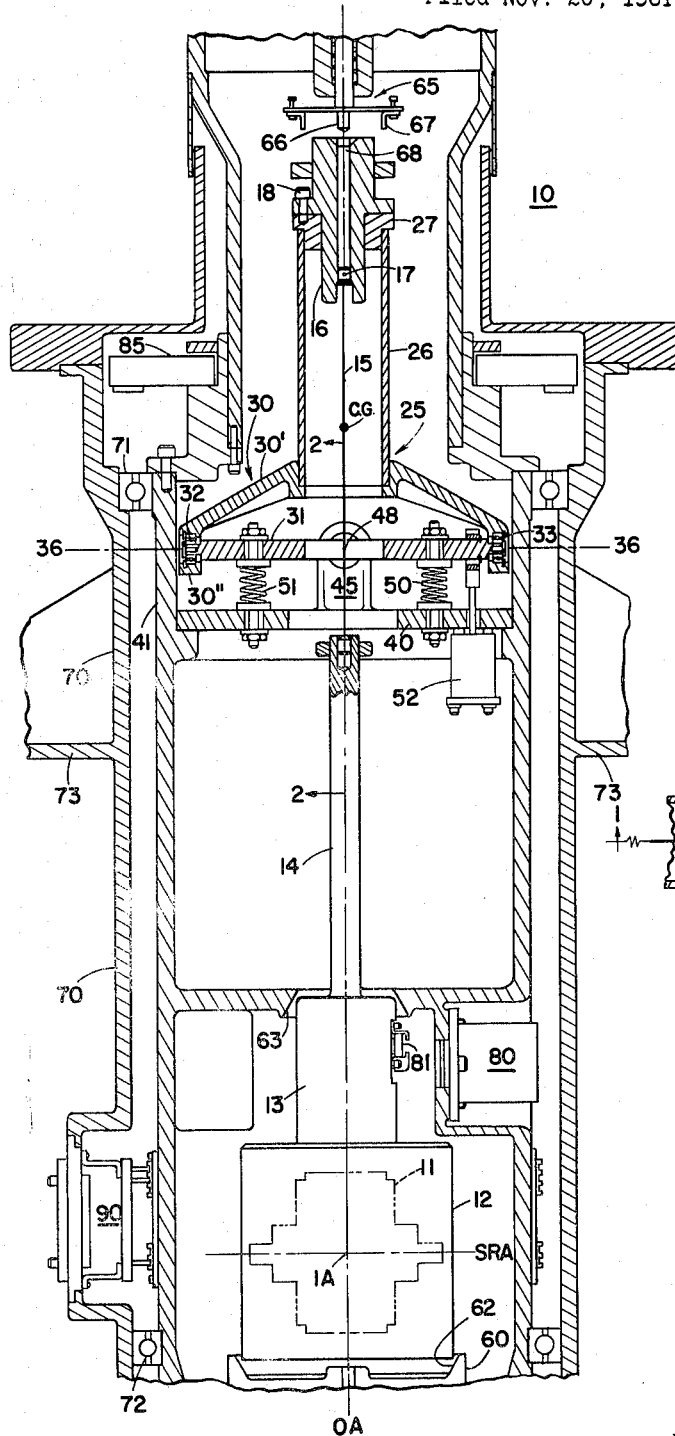

May 10, 1966  D. P. MILLER  3,250,136
CONTROL APPARATUS
Filed Nov. 20, 1961

INVENTOR.
DON P. MILLER
BY Roger W. Jensen
ATTORNEY.

United States Patent Office 3,250,136
Patented May 10, 1966

---

3,250,136
CONTROL APPARATUS
Don P. Miller, Minneapolis, Minn., assignor to
Honeywell Inc., a corporation of Delaware
Filed Nov. 20, 1961, Ser. No. 153,512
8 Claims. (Cl. 74—5.5)

This invention relates to vibration isolators and more particularly to low frequency vibration isolators. The inventor's unique low frequency vibration isolator is specifically applicable to a pendulous gyro northfinder such as disclosed in the application of H. A. Dinter, Jr., Serial No. 120,559, filed June 29, 1961, now Patent No. 3,098,-306, and assigned to the same assignee as the present application. However, the inventor wishes it to be understood that the low frequency vibration isolator is not limited thereto.

As disclosed in application Serial No. 120,559, a pendulous gyroscopic northfinder consists basically of a gyro spin motor rotatably mounted within a gimbal means for rotation about a spin reference axis (SRA). The SRA is maintained approximately parallel to the surface of the earth. The gimbal means is pendulously suspended within a housing element by means of a suspension wire. The axis of the suspension wire is approximately perpendicular to the SRA and coincides with the output axis (OA) of the gyro. The gimbal means is allowed to rotate about the OA—the axis of the suspension wire. The input axis (IA) of the gyro is perpendicular to both the SRA and the OA.

When the spin motor is energized and rotates about the SRA, the SRA in turn oscillates about the OA indicating the true north direction. The pendulous gyro northfinder disclosed in application Serial No. 120,599 is capable of determining the true north direction to within five arc-seconds in a normal field environment.

Recently however, it has become necessary to utilize a pendulous gyro northfinder in a low frequency translational vibration environment. Such an environment is encountered when the pendulous gyro northfinder is used in cooperation with a mobile rocket launcher. This low frequency translational vibration environment develops due to steady state and gust wind loading upon the launch tower upon which the northfinder is mounted. Low frequency vibrations, as referred to in this application, are defined as vibrations having a frequency less than two cycles per second.

A translational vibration acting upon the pendulous gyro northfinder results in an oscillatory motion being applied to the upper support of the suspension wire which suspends the gimbal element. This results in what is known as coning errors. To explain further, an oscillatory motion applied to the upper suspension wire support acting on a translational plane perpendicular to OA of the gyro, results in the IA being forced to describe a conical motion in space. The gyro senses this conical motion of the IA which is added to or subtracted from the earth's rate to produce an error in determining the true north direction. Since the amount of coning error varies continually with variations in the translational vibrations, there is no way of compensating for it. Consequently, the pendulous gyro northfinder disclosed in application Serial No. 120,559 does not provide an indication of the true north direction within the required accuracy, when subjected to a low frequency translational vibration environment.

The applicant has provided a pendulous gyro northfinder which will indicate the true north direction within the desired accuracy, that is, within five arc-seconds when subjected to a low frequency translational environment. The applicant has accomplished this through the utilization of a unique low-frequency vibration isolator. More specifically, the applicant provides a unique vibration isolator which is utilized to isolate the upper suspension wire support from the translational vibrations. The isolation of the upper suspension wire support substantially reduces the coning errors in the pendulous gyro northfinder and allows the northfinder to function within the required accuracy.

The applicant's unique vibration isolator comprises a unique suspension means which has an extremely low spring rate thereby isolating the upper suspension wire support from low frequency vibrations. The extremely low spring rate is accomplished by providing an inverted pendulum means having a negative spring rate in cooperation with spring means having a positive spring rate slightly greater than the negative spring rate of the inverted pendulum means. The upper support of the suspension wire is then attached to the suspension means at a unique position. The unique position may be the center of percussion of the inverted pendulum means but is not limited thereto. The net result is a pendulous gyro north-finder suspended so as to have a very low natural frequency, on the order of .2 cycle per second.

It is therefore an object of this invention to provide an improved control apparatus.

Figure 2:
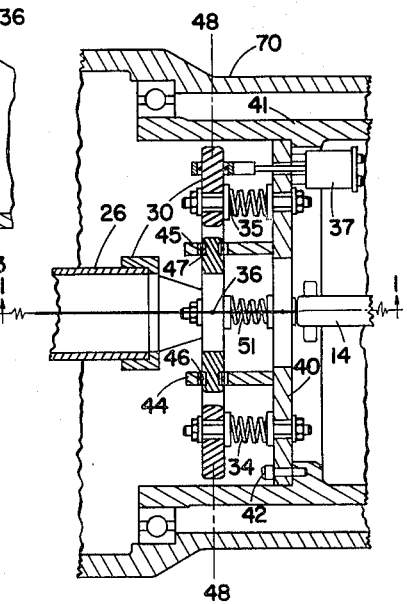

This and other objects of the invention will become apparent from a study of the accompanying specification and claims in conjunction with the drawing in which:

FIGURE 1 is a cross-sectional view of a pendulous gyro northfinder utilizing the applicant's low frequency vibration isolator; and FIGURE 2 is a cross-sectional view taken along lines 2—2 of FIGURE 1.

Referring now to FIGURE 1, reference numeral 10 generally depicts a pendulous gyro northfinder. A gyro spin motor rotor is identified by reference numeral 11 and is rotatably mounted by suitable means (not shown) within a cylindrical gimbal element 12. The spin reference axis of rotor 11 is identified by the symbol SRA. The SRA is generally positioned parallel to the surface of the earth during the operation of the pendulous gyro northfinder. The gimbal element 12 has a cylindrical extension portion 13 rigidly attached to one end and concentric therewith. An elongated cylindrically shaped mast element 14 is rigidly attached to the gimbal element 13 and concentric therewith.

The gimbal element 12, extension element 13 and mast element 14 are pendulously suspended by means of a suspension wire 15. The suspension wire 15 is attached to an inverted pendulum means 25.

The inverted pendulum means 25 comprises an elongated tube 26 which is suspended from a point below the center of mass of the tube by means of a yoke 30'. Invented pendulum means 25 is universally mounted at its point of suspension by means of two gimbal members 30 and 31. The center of mass or center of gravity of inverted pendulum means 25 is identified in FIGURE 1 by reference symbol C.G. Rigidly attached to the upper end of tube 26 is an insert 27. A connecting means 16 is attached to insert 27 by means of screws 18. Suspension wire 15 is attached to connecting means 16 at support point 17. Yoke 30' located at the other end of tube 26 is rigidly attached to gimbal member 30. The gimbal member 30 comprises a generally circular element 30" rigidly attached to yoke 30'. The circular element 30" is connected to gimbal element 31 by suitable bearing means 32 and 33. In a plan view, gimbal element 31 appears as a cruciform shaped element. The bearing means 32 and 33 define a first axis 36 about which the inverted pendulum means 25 is free to rotate. It should be noted that gimbal element 30 circumscribes gimbal element 31.

Referring now to FIGURE 2, which is taken along section line 2—2 of FIGURE 1, it is seen that inverted pendulum means 25 is biased perpendicular to axis 36 (vertical) by means of compression springs 34 and 35. In FIGURE 1 inverted pendulum means 25 is illustrated as biased in the vertical direction, which is the null position. Various other means may be utilized to bias inverted pendulum means 25 to the null position, e.g., tension springs may be connected between a fixed member and inverted pendulum means 25. The applicant does not wish to be limited to the embodiment illustrated. An air damper 37 is provided for damping any displacement of the inverted pendulum means 25 about axis 36. Other damping means may be utilized in place of the air damper, e.g., a viscous or a magnetic damper. It will be noted that compression springs 34 and 35 are both connected between gimbal element 30 and a bracket 40. Bracket 40 is rigidly attached to a casing 41 by suitable means such as screws 42. Damper 37 is also connected between the gimbal element 30 and bracket 40. In effect, springs 34 and 35 and damper 37 are connected between the gimbal element 30 and casing 41.

Further reference to FIGURE 2 discloses that gimbal element 31 is also rotatably mounted upon bracket 40 by means of mounting blocks 44 and 45. The mounting blocks 44 and 45 contain suitable bearing means 46 and 47 respectively, which define a second axis of rotation 48 about which the inverted pendulum means 25 is free to rotate.

Referring again to FIGURE 1, two compression springs 50 and 51 are provided which connect gimbal element 31 to bracket 40 thereby biasing inverted pendulum means 25 perpendicular to axis 48 in the vertical direction. Again, various means may be utilized to bias inverted pendulum element 25 in the vertical direction. An air damper 52 is connected between gimbal element 31 and bracket 40 so as to damp any displacement of the inverted pendulum means 25 about the axis 48. Various other damping means may be utilized in place of the air damper illustrated.

From the structure thus far described, it is clear that gyro rotor 11, gimbal element 12, extension 13, and mast 14 are pendulously supported by means of suspension wire 15. The suspension wire 15 is connected to inverted pendulum means 25, which is universally supported by gimbal elements 30 and 31. Inverted pendulum means 25 is biased in the vertical direction by suitable spring means and any displacement of the inverted pendulum means 25 from the vertical direction is damped by suitable damping means.

When the pendulous gyro northfinder is not operating and/or is being transported it is necessary to cage the elements relative to the casing 41 to prevent damage to the elements. A cylindrical caging element 60 having a conical surface 62 thereon is mounted upon casing 41 by means of a shaft (not shown). A cooperating conical surface 63 is located upon casing 41 adjacent to gimbal extension 13. Caging element 60 is moved upwardly, as viewed in FIGURE 1, to cage gimbal 12. Surface 62 contacts gimbal 12 thereby displacing it upwardly against surface 63 and holding gimbal 12 in this position to prevent relative movement between gimbal 12 and casing 41. An upper caging means 65 is also provided to cage inverted pendulum means 25. Upper caging means 65 comprises a shaft 66 and a guide bracket 67. Caging means 65 is moved downwardly, as viewed in FIGURE 1, to cage inverted pendulum means 25. Shaft 66 is positioned within a bore 68 in connecting means 16 and guide means 67 is positioned around the periphery of connecting means 16 thereby preventing relative movement between inverted pendulum means 25 and casing 41. The pendulous gyro northfinder 10 is uncaged as illustrated in FIGURE 1.

The casing 41 is rotatably mounted within a housing 70 by means of bearing means 71 and 72. Housing element 70 is mounted upon a tripod means (not shown) and positioned so that the axis defined by bearing means 71 and 72 is parallel to the earth's gravity vertical. In this position, the axis of suspension wire 15 is coincident with the axis defined by bearing means 71 and 72. As the gimbal 12 oscillates about the axis of suspension wire 15, the connecting means 16 and support point 17 are also rotated about the axis of suspension wire 15 in phase with the gimbal assembly so as to eliminate suspension wire windup torques and permit a more accurate output signal. This is accomplished by rotating the casing 41 about the axis defined by bearing means 71 and 72, which is coincident with the axis of suspension wire 15, in phase with the rotation of the gimbal 12. An optical nulling device 80 is attached to the casing 41 and cooperates with an optical flat mirror 81 attached to the gimbal extension element 13. Rotation of the gimbal 12 about the axis of suspension wire 15 will produce an error signal in the optical nulling device 80 which is utilized to rotate the casing 41 by means of a torque motor (not shown) so as to maintain support point 17 in phase with the gimbal 12.

An azimuth reference circle 85 is rigidly attached to the rotating case 41. Suitable means are provided (not shown) to view reference circle 85 so as to indicate the displacement of the casing 41 relative to the housing 70 as it rotates in phase with the gimbal 12 and the SRA. The position of casing 41 is an indication of the true north direction.

Current is supplied between the housing 70 and rotating case 41 through the slip ring assembly 90. Means (not shown) are provided for transmitting the current from the casing 41 to the gyro spin motor 11.

When a prior art pendulous gyro northfinder is subjected to a low frequency translational vibration environment, the vibration is transmitted to the gyro rotor which results in coning errors hereinbefore described. The coning errors induced by the low frequency translational vibration result in an erroneous output signal. The applicant has overcome this disadvantage of the prior art pendulous gyro northfinders by providing a pendulous gyro northfinder with a natural frequency which is extremely low. The actual value of the natural frequency depends upon the particular environment to which the northfinder is to be subjected. In one particular embodiment the natural frequency is approximately .3 radians per second. The applicant obtains a low natural frequency for a pendulous gyro northfinder by utilizing a unique suspension means for the gyro element.

To explain further, it can be shown that the natural frequency of the pendulous gyro northfinder about an axis varies as a function of the spring rate of the pendulous gyro northfinder. The spring rate K, relative to axis 48 of the embodiment illustrated, can be defined as:

$$K = kL_1^2 - (M_2L_2 + Mh)g$$

where $k$=combined spring rate of springs 50, 51; $L_1$=distance from axis 48 to each of the springs 50, 51; $M_2$=mass of the inverted pendulum means; $L_2$=the distance between axis 48 and the center of gravity C.G. of inverted pendulum means; $M$=mass of the gyro gimbal assembly; $h$=distance between point of suspension 17 and axis 48; and $g$=acceleration of gravity.

One means of obtaining a low natural frequency for the pendulous gyro is to reduce the spring rate—the restraining force per unit deflection. However, in attempting to obtain a suitable spring rate such as by elastically supporting the pendulous gyro, the physical size of such elastic support means becomes so small as to be impossible to fabricate. The applicant has overcome this difficulty through the utilization of an inverted pendulum means.

The inverted pendulum means 25 is supported by the gimbal elements 30 and 31 at a point below its center of mass C.G. This means that inverted pendulum means 25 is in the state of unstable equilibrium and a deflection of the inverted pendulum means will result in it tending to be displaced still further from its original vertical position. Stated otherwise, the restoring force acting on the inverted pendulum means decreases upon continued displacement from the null or vertical position; this is the definition of a negative spring rate. There are two forces tending to displace inverted pendulum means 25 from the vertical position: (1) the force due to the acceleration of gravity acting upon the center of mass of the inverted pendulum means; and (2) the force of the tension of suspension wire 15 exerted on support point 17. Both of these forces are acting on inverted pendulum means 25 at a point above its support means. Both of these forces can be defined as negative forces tending to displace inverted pendulum means 25 further away from its null or vertical position. Thus it is seen that inverted pendulum means 25 has a relatively large negative spring rate. However, the applicant provides springs 34, 35 and 50, 51, to bias inverted pendulum means to the vertical position. The restoring force of the compression springs 34, 35 and 50, 51 increases upon continued displacement from a null position, consequently the springs are defined as having a positive spring rate. By careful selection and adjustment of the compression springs 34, 35 and 50, 51, the applicant provides a positive spring rate which just slightly exceeds the negative spring rate of the inverted pendulum means. The net result is an extremely small spring rate for the pendulum gyro northfinder which may be practically obtained.

By obtaining an extremely small spring rate for the pendulous gyro northfinder the natural frequency of the pendulous gyro northfinder is reduced to a low frequency thereby isolating it from low frequency vibrations. By providing a low natural frequency for a pendulous gyro, low frequency vibrations will not be transmitted to the gyro wheel and coning errors will be substantially reduced. Consequently, a pendulous gyro northfinder may provide an accurate indication of the true north direction while subjected to a low frequency translational vibration environment.

The point of suspension of the suspension wire 15 to the inverted pendulum means may vary within a limited range. Theoretical analysis and experimentation has determined that one point of attachment which is desirable is the center of percussion of the suspension means. Support point 17 is located at the center of percussion of inverted pendulum means 25 as illustrated in FIGURE 1. However, support point 17 may be slightly displaced from the center of percussion without critically affecting the performance of the vibration isolator.

Thus, the applicant has provided an improved pendulous gyro northfinder which is capable of providing an accurate indication of the true north direction while operating in a low frequency translational vibration environment. This result has been accomplished by utilizing a means including an inverted pendulum means to provide a low natural frequency for the pendulous gyro northfinder thereby isolating the pendulous gyro from low frequency vibrations.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What I claim is:

1. A low frequency vibration isolator for a pendulous gyro northfinder comprising: a housing element; an inverted pendulum means; mounting means, said mounting means mounting said inverted pendulum means upon said housing element for displacement about two mutually perpendicular axes, and said inverted pendulum means being characterized by having a negative spring rate; a plurality of centering springs, said centering springs biasing said inverted pendulum means to a position parallel to the gravity vertical, said centering springs having a positive spring rate greater than the negative spring rate of said inverted pendulum means; damping means, said damping means damping the displacement of said inverted pendulum means from the vertical position; and connecting means, said connecting means being located at the center of percussion of said inverted pendulum means, and the gyro being attached to said connecting means and thereby being isolated from low frequency vibrations acting upon said housing element.

2. A low frequency vibration isolator for a pendulous gyro northfinder comprising: an inverted pendulum means; mounting means; housing means; said mounting means positioning said inverted pendulum means parallel to the gravity vertical upon said housing means, said mounting means allowing said inverted pendulum means to be displaced from the position parallel to the gravity vertical, and said inverted pendulum means being characterized by having a negative spring rate; a plurality of centering springs, said centering springs biasing said inverted pendulum means parallel to the gravity vertical, said centering springs having a positive spring rate greater than the negative spring rate of said inverted pendulum means; damping means, said damping means damping the displacement of said inverted pendulum means; and connecting means, said connecting means being located at the center of percussion of said inverted pendulum means, and the gyro being attached to said connecting means and thereby being isolated from low frequency vibrations acting upon said housing means.

3. A low frequency vibration isolator for a body comprising: an inverted pendulum means; a housing element; mounting means vertically mounting said inverted pendulum means upon said housing element for displacement about two mutually perpendicular axes, said inverted pendulum means having a negative spring rate; a plurality of springs, said springs biasing said inverted pendulum means to the vertical position, said springs having a positive spring rate greater than the negative spring rate of said inverted pendulum means; damping means, said damping means damping the displacement of said inverted pendulum means; and connecting means, said connecting means being located at the center of percussion of said inverted pendulum means, and the body being attached to said connecting means and thereby being isolated from low frequency vibrations.

4. A low frequency vibration isolator for a body comprising: an inverted pendulum means; mounting means; housing means; said mounting means positioning said inverted pendulous means upon said housing means parallel to the gravity vertical, said mounting means permitting said inverted pendulous means to be displaced from the position parallel to the gravity vertical, and said inverted pendulum means having a negative spring rate; a plurality of springs, said springs biasing said inverted pendulum means in the vertical position, said springs having a positive spring rate greater than the negative spring rate of said inverted pendulum means; damping means, said damping means damping the displacement of said inverted pendulum means; and connecting means attached to said inverted pendulum means, the body being attached to said connecting means and being isolated from low frequency vibrations.

5. In a low frequency vibration isolator for a pendulous gyro northfinder: an inverted pendulum means; casing means; said inverted pendulum means being universally supported upon said casing means by a mounting means; a plurality of springs, said springs being connected between said inverted pendulum means and said casing means thereby biasing said inverted pendulum means in a vertical position; damping means, said damping means damping displacements of said inverted pendulum means; and means connecting the gyro to the center of percussion of said inverted pendulum means thereby isolating said gyro from low frequency vibrations acting upon said casing means.

6. A low frequency vibration isolator for a pendulous gyro northfinder comprising: casing means; an inverted pendulum means; mounting means supporting said inverted pendulum upon said casing for movement about a plurality of axes; a plurality of springs, said springs biasing said inverted pendulum means in a vertical position; damping means, said damping means damping displacements of said inverted pendulum means; and means connecting the gyro to the center of percussion of said inverted pendulum thereby isolating said gyro from low frequency vibrations acting upon said casing means.

7. A low frequency vibration isolator for a pendulous gyro comprising: an inverted pendulum; casing means; mounting means, said mounting means universally mounting said inverted pendulum upon said casing means; a plurality of springs biasing said inverted pendulum in a vertical position; damping means, said damping means damping displacements of said inverted pendulum; and means connecting the gyro to said inverted pendulum thereby isolating said gyro from low frequency vibrations acting upon said casing means.

8. A low frequency vibration isolator for a body comprising: a support means; an inverted pendulum universally mounted upon said support means; a plurality of springs independent of said inverted pendulum biasing said inverted pendulum in a vertical position; and damping means independent of said inverted pendulum, said damping means damping displacements of said inverted pendulum, and the body being attached to said inverted pendulum and thereby being isolated from low frequency vibrations acting upon said support means.

References Cited by the Examiner

UNITED STATES PATENTS

| | | | |
|---|---|---|---|
| 1,173,241 | 2/1916 | Anschutz-Kaempfe | 74—5.43 |
| 2,269,103 | 1/1942 | Harding et al. | 74—5 |
| 2,430,709 | 11/1947 | Devorss | 74—5 X |
| 2,966,744 | 1/1961 | Mueller | 74—5 X |

FOREIGN PATENTS

| | | |
|---|---|---|
| 636,829 | 1/1928 | France. |
| 240,369 | 11/1911 | Germany. |

MILTON KAUFMAN, *Primary Examiner.*

BROUGHTON G. DURHAM, *Examiner.*

T. W. SHEAR, *Assistant Examiner.*